Sept. 8, 1931. J. BARRETT 1,822,643
RIM TOOL
Filed March 13, 1930.
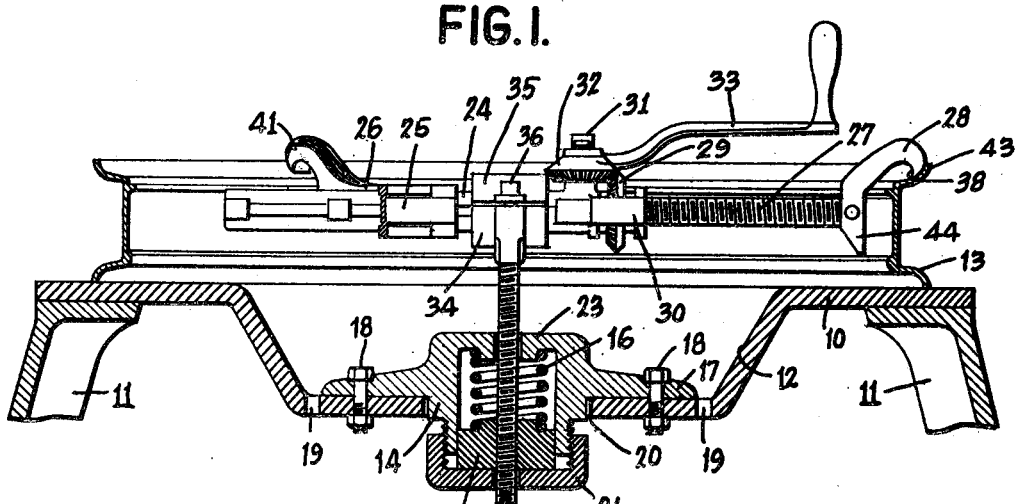
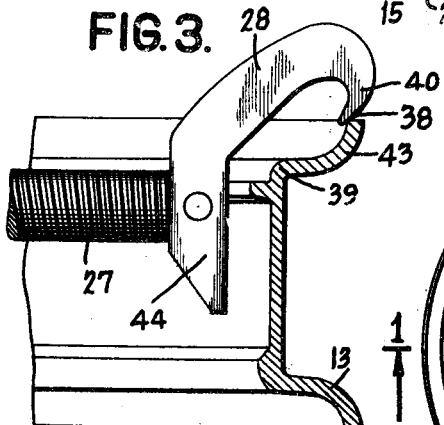
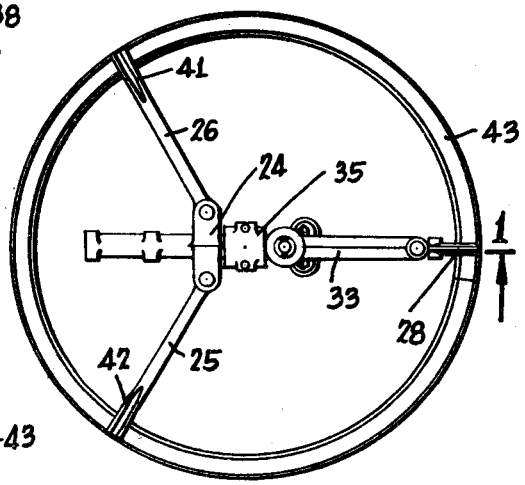
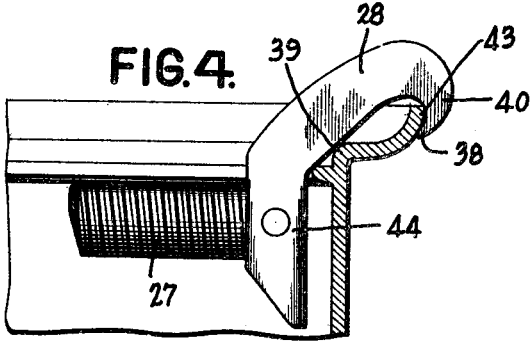
Inventor
JAMES BARRETT
By his Attorneys
Cooper, Kerr and Dunham Patented Sept. 8, 1931

1,822,643

UNITED STATES PATENT OFFICE

JAMES BARRETT, OF NEW YORK, N. Y.

RIM TOOL

Application filed March 13, 1930. Serial No. 435,410.

This invention relates to tools for facilitating the mounting of a tire upon and the removal of a tire from a split-rim, and more particularly, to a combination of a rim-tool and table which renders it possible to handle a rim and complete the tire removing and mounting operations with ease and expeditiously.

It is well known that the use of a portable rim-tool of the type having three arms, one of which is longitudinally movable, requires careful application to the task at hand and that injurious results may follow should the tool slip while the rim is contracted, for, under such a condition, the full effect of the tensioned rim is restrained by the tool. It is, therefore, among the objects of my invention to provide an apparatus which enables the safe use of a three armed rim-tool.

Another object of the invention is to provide a rim-tool and table assembly with which all of the operations necessary for mounting a tire may be performed with the least handling of a rim, tire and tool and be convenient and subject to ready adjustment for use with rims of different sizes.

Another object of the invention is to provide a simplified rim-tool and table arrangement whose operation may be readily understood by a tyro, and which may be produced at relatively low cost and yet serve all of the uses which are delegated to such a tool.

Other objects and advantages will be pointed out hereinafter in the description of the invention and illustrated in the drawings which show the preferred form of the rim-tool of my invention.

Fig. 1 is a vertical section through the table and on line 1—1 of Fig. 2.

Fig. 2 is a plan of the rim-tool shown with a rim.

Fig. 3 is a detail showing how the claws of the rim-tool control the raised position of the rim-tool and their own relation to the rim before the claw of the rim-tool passes over the flange of the rim.

Fig. 4 is another detail showing the relation of one of the claws of the rim-tool to the rim when in useful engagement.

In Fig. 1 I have shown so much of a table as is necessary for understanding my invention. The table-top 10 may be supported at any convenient height by some such means as legs 11. In general, it will be found satisfactory to make the table-top 10 in the form of a dish-shaped casting or of pressed steel and in either case the legs could be channel-bars suitably footed to stand on the ground.

While other forms of table-tops may be used to gain the advantages and relations about to be described, the one illustrated will serve satisfactorily. This table-top is disked in the center as at 12. The upper surface of the top 10 is used for supporting a rim 13 while it is being operated upon. The broad annular top available is suitable for supporting rims of all sizes from the smallest to the largest.

At the center of the table is mounted a hub or annular member 14 enclosing a nut 15 and spring 16, as in a box. The hub has a flange 17 by which it rests upon and is supported by the table. Bolts 18 are provided for anchoring the hub in place.

Preferably, the center of the table is provided with holes 19 for draining water and a large central perforation 20 is provided in the construction illustrated for the purpose of accommodating the cap 21 on the lower portion of the hub 14 and for permitting screw 22 to pass below the table.

Screw 22 is the supporting member for the rim-tool and it is maintained vertically by nut 15 which rests against cap 21. The force of spring 16, as it is compressed between nut 15 and hub end 23, suffices to prevent the nut from rotating with the screw and, therefore, the nut may be in the form of a disk. The screw and nut thereby constitute the elevating mechanism by which the elevated position of the rim-tool may be changed, and which, for functions to be described, serve to permit rotary movement of the rim-tool about the axis of the screw. By choice, it is apparent that the nut 15 could be splined to the hub 14 or rectangular in engagement with plane inner walls of the hub so as to prevent rotation thereof relative to the hub and such construction might be preferable for heavy duty tools. Cap 21, which closes the lower end of hub 14, is an abutting surface for spring 16 and by its position on the hub the degree of compression of the spring is controlled. Hence, by adjusting the position of the cap the compression in the spring may be adjusted.

I prefer to make the rim-tool supporting member 22 in the form of a screw because of the simplicity attached to such a construction for permitting adjustments in height to accommodate rims of different widths, but it will be readily appreciated that for tools which need no other adjustment in height than that permitted by spring 16, supporting member 22 could be without spiral threads.

The rim-tool has a spider 24 having lateral arms to which are pivoted, respectively, arm 25 and arm 26, Fig. 2. The main body of the spider is tubular and receives sliding arm or screw 27 to which is secured claw 28, Fig. 1. A nut, which carries bevel gear 29, engages screw 27 and it is held from translatory movement by yoke 30, carried by the spider. The spider also carries a stud 31 upon which is mounted bevel gear 32. This bevel gear meshes with bevel gear 29 and both gears are rotated and arm 27 is translated by the operation of the hand crank 33 extending from gear 32.

Upon the upper end of screw 22 there is mounted member 34 which rests beneath the spider and supports the rim-tool. A cap-square 35 is held against the upper portion of the spider by screws 36 which firmly hold the cap-square and member 34 together, and, hence, rigid support for the rim-tool is provided. This means of supporting the rim-tool upon screw 22 is only one of many ways of doing so.

Operation

When a rim is to be split, screw 27 is moved inward sufficiently to permit the placing of the rim upon table 10. The rim-tool is then turned about the axis of screw 22, if necessary, until the height of the tool above the table is such that the ends 38 of the claws of the tool are just below and within the shoulder 39 of the flange of the rim and claw 28 is near the end of the rim which is to be sprung. While this adjustment for height is taking place, or either before or after, the arms 25 and 27 are adjusted to desired angular positions, Fig. 2, (if the tool permits of their adjustment), and crank 33 is then turned so as to drive screw 27 outwardly. As the screw 27 moves outwardly, the cam surfaces 40, Fig. 3, one of which is provided on each claw 28, 41 and 42, bear upon shoulder 39 and then upon the outer rim 43 and cause the rim-tool to be raised against the action of spring 16. After the end of the claws have surmounted first shoulder 39 and then the outer rim 43, the spring will operate to cause the rim-tool to clamp, so to speak, the rim against the table, Fig. 4.

For splitting the rim, the direction of rotation of the crank 33 is reversed and screw 27 is moved inwardly. This movement causes claw 38 to spring one end of the rim inwardly and thereby release it from engagement with the other end.

When the rim has been split by this action, the tool is eased upwardly a little and rotated in respect to the rim about 70° and so positioned that the claw 28 engages the end of the rim which is now the inner lap. In this position, the hook portions of the claws engage the outer rim and, as screw 27 is moved inwardly the hook portion of claw 28, Fig. 4, draws the inner lap end of the rim inwardly to the extent necessary for permitting mounting or removal of a shoe. For closing the rim, the heel 44 is forced against the inner lap of the rim. The lap is then moved into place by the outward movement of screw 27. It is believed that the foregoing description will suffice to explain the construction of my invention and its advantages and uses and, therefore, I consider it unnecessary to explain other and different methods which may be employed by one using the tool.

The tool may be relieved from engagement with the rim by first positioning screw 27 so that the rim may be moved on the table. Then with the two arms together, the two arms may be raised against the action of spring 16. While in this position the crank is rotated so as to bring the claws of the tool within the rim.

It is apparent that the invention is capable of wide variation and relationship of parts without departure from the nature and principle thereof. I, therefore, do not restrict myself unessentially in the foregoing or other particular, but contemplate such alterations and modifications within the scope of the appended claims as may be found advisable.

I claim:

1. In a device for rim-breaking and the like, the combination with a table and a rim-tool having a spider supporting arms extending therefrom, at least one of said arms being longitudinally movable relative to the spider, a screw member fastened to said spider, and means for supporting said screw member from said table, said means comprising a nut, an annular retaining element for the nut, and resilient means cooperatively associated with said nut and annular member for constantly urging the rim-tool to a definite position yet permitting the rim-tool to be moved from such position against the action of the resilient means.

2. In a device for rim-breaking and the like, the combination with a table and a rim-tool having a spider supporting arms extending therefrom, at least one of said arms being longitudinally movable relative to the spider, a rim-tool supporting member extending from said spider, said member being threaded, and means supporting said threaded member for enabling rotation and translation thereof during manipulation of the rim-tool, said means comprising a nut engaging said threaded member, a box having a cap, and resilient means within said box compressed between said cap and nut and permitting travel of the nut within the box when the screw member is translated.

In testimony whereof I hereto affix my signature.

JAMES BARRETT.